United States Patent
Caroli et al.

(10) Patent No.: US 6,661,946 B2
(45) Date of Patent: Dec. 9, 2003

(54) METHOD OF CONTROLLING OPTICAL SIGNAL POWER AT AN ADD/DROP NODE IN A WDM OPTICAL COMMUNICATION SYSTEM

(75) Inventors: Carl A Caroli, Locust, NJ (US); Robert D. Feldman, Middletown, NJ (US); Scott D Young, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/901,290

(22) Filed: Jul. 9, 2001

(65) Prior Publication Data

US 2003/0007722 A1 Jan. 9, 2003

(51) Int. Cl.[7] .................................................. G02B 6/28
(52) U.S. Cl. ........................... 385/24; 398/93; 398/94; 398/79; 398/82; 398/34
(58) Field of Search ....................... 385/24; 359/124, 359/127, 110; 398/93, 94

(56) References Cited

U.S. PATENT DOCUMENTS

| | | | | |
|---|---|---|---|---|
| 6,101,012 A | * | 8/2000 | Danagher et al. | 359/110 |
| 6,122,095 A | * | 9/2000 | Fatehi | 359/127 |
| 6,208,441 B1 | * | 3/2001 | Jones et al. | 359/124 |
| 6,212,315 B1 | * | 4/2001 | Doerr | 359/124 |
| 6,317,231 B1 | * | 11/2001 | Al-Salameh et al. | 359/110 |
| 6,317,233 B1 | * | 11/2001 | Son | 359/110 |
| 6,392,769 B1 | * | 5/2002 | Ford et al. | 359/110 |
| 6,421,169 B1 | * | 7/2002 | Bonnedal et al. | 359/337.1 |
| 6,449,068 B1 | * | 9/2002 | Turner et al. | 359/110 |
| 6,456,408 B1 | * | 9/2002 | Moeller | 359/124 |
| 2002/0101652 A1 | * | 8/2002 | Hayashi et al. | 359/341.4 |
| 2002/0122224 A1 | * | 9/2002 | Rappaport et al. | 359/124 |

FOREIGN PATENT DOCUMENTS

WO   WO 00 41346 A   7/2000   .......... H04B/10/17

\* cited by examiner

Primary Examiner—Brian Healy
Assistant Examiner—David Petkovsek
(74) Attorney, Agent, or Firm—Gregory J. Murgia

(57) ABSTRACT

Optical signal power levels for selected optical channels processed within an add/drop node in a wavelength division multiplexed (WDM) system are adjusted as a function of variations in signal power in an incoming WDM signal caused by gain ripple. In particular, a "ripple fitting" method is described whereby the optical signal power of individual optical channels being added at the add/drop node are adjusted to levels that correspond to the ripple profile of other optical channels being routed through the add/drop node. In this manner, the gain ripple in the WDM signal being output from the add/drop node approximately corresponds to the gain ripple in the incoming WDM signal at the node.

27 Claims, 8 Drawing Sheets

METHOD OF CONTROLLING OPTICAL SIGNAL POWER AT AN ADD/DROP NODE IN A WDM OPTICAL COMMUNICATION SYSTEM

FIELD OF THE INVENTION

The invention relates generally to optical communication systems employing wavelength division multiplexing (WDM) and, more particularly, to controlling optical signal power when individual optical channels are added or dropped at nodes in such systems.

BACKGROUND OF THE INVENTION

Optical fiber is fast becoming a transmission medium of choice for many communication networks because of the speed and bandwidth advantages associated with optical transmission. In addition, wavelength division multiplexing (WDM) is being used to meet the increasing demands for more capacity in optical communication networks. As is well known, WDM combines many optical channels each at a different wavelength for simultaneous transmission as a composite optical signal in a single optical fiber. By using optical transmission and WDM in the backbone networks, the communications industry has made great strides in terms of offering greater capacity and transmission speeds in today's networks.

Management of this increased capacity in WDM systems, i.e., managing the communications traffic transported in many different optical channels, is an important aspect of any WDM-based communication network. For example, WDM systems typically include an add/drop capability whereby signals transported on the individual optical channels can be selectively added or dropped at various nodes in a network.

One of the challenges associated with adding and dropping optical channels in existing systems is controlling the signal power of a WDM signal at an add/drop node and, in particular, controlling the signal power of the individual optical channels that are added, dropped, or directly routed through the node without being either added or dropped. For example, power divergence is a problem that can occur in which optical channels in a WDM signal have different signal power levels. By way of example, power divergence can occur in an add/drop node because different optical channels are routed along different paths and through different components within the add/drop node. In particular, those optical channels being dropped will be routed through a path containing components for removing the optical channels of interest from the WDM signal. Similarly, optical channels being added originate from and are routed through other components in another transmission path. Finally, optical channels that are capable of being dropped as well as those optical channels that are expressly routed through a node each may traverse a different transmission path within the node. The power levels of each of these types of optical channels can therefore differ because of the different loss characteristics of the components within each of the paths as well as the different compensation schemes (e.g., optical amplification) that may be used within any of the transmission paths.

Another cause of power divergence among the different optical channels of a WDM signal is so-called "ripple", which is a well-known phenomenon in optically amplified systems. In particular, a spectrum of optical channels in a WDM signal may accumulate tilt and ripple effects as the WDM signal propagates along a chain of optical amplifiers, e.g., multiple optical repeater nodes spaced between end terminals and add/drop nodes. As is well-known, ripple is manifested as a substantially non-random power divergence whereby signal power across the spectrum of optical channels in a WDM signal varies in a somewhat sinusoidal-type pattern or profile that is sometimes referred to as a "ripple curve". Generally, gain flatness is a desirable characteristic of optical transmission whereby the gain is relatively flat across the various wavelengths (i.e., optical channels). It is therefore desirable to compensate for the peak-to-peak deviation, e.g., ripple, of signal power in an optically amplified WDM signal. As such, gain equalization techniques are commonly employed to flatten or tilt a broadband optical amplifier profile to obtain spectral flatness and low ripple in the WDM signal. However, incorporating gain equalization filters to compensate for ripple at the input of every add/drop node would introduce an unacceptable amount of loss. Adding optical amplification to compensate for these additional losses can lead to more noise, e.g., higher noise figure in the optical amplifier and a lower optical signal-to-noise ratio.

Compensating for ripple at an add/drop node is also complicated by other factors. In particular, individual optical channels in a WDM signal are routed along different paths and through different components within the add/drop node depending on whether the optical channel is being dropped, added, or routed through the node either directly or indirectly. As such, ripple in the incoming WDM signal may be carried through the node on certain optical channels but not others, e.g., on the "express" channels routed through a node and not on the channels being added at the node. The different optical signal power levels for the individual optical channels as well as gain ripple must therefore be taken into consideration when combining the optical channels to generate the WDM output signal from the add/drop node.

SUMMARY OF THE INVENTION

The optical signal power of a WDM signal processed at an add/drop node is controlled to account for uncorrected ripple in the WDM signal according to the principles of the invention by adjusting the optical signal power level of optical channels being added at the add/drop node to match the ripple exhibited by optical channels that are expressly routed through the add/drop node. In this manner, the ripple in the WDM signal being output from the add/drop node approximately corresponds to the ripple in the incoming WDM signal at the node.

In one illustrative embodiment, an add/drop node in a WDM system receives a WDM input signal exhibiting ripple. The add/drop node includes an "express" transmission path for routing selected optical channels of a WDM input signal directly through the node, a "drop" transmission path for dropping selected optical channels from the WDM input signal, a "through" transmission path for routing selected optical channels through the node that are not being dropped, and an "add" transmission path for adding selected optical channels. The optical channels from the "express", "through", and "add" transmission paths are combined to form a WDM output signal. According to the principles of the invention, a target signal power level is determined for the optical channels in the "through" path and the total signal power of the optical channels in the "express" path is coarsely adjusted to a level that is approximately equal to the target signal power level. The signal power levels of individual optical channels in the "through" and "add" paths are then adjusted on a per-channel basis as a function of the ripple that is present in the optical channels in the "express" path. In this manner, a "ripple fitting" adjustment is made so that the signal power of the "add" and "through" optical channels effectively matches or follows the ripple that is present in the incoming WDM signal.

BRIEF DESCRIPTION OF THE DRAWING

A more complete understanding of the present invention may be obtained from consideration of the following detailed description of the invention in conjunction with the drawing, with like elements referenced with like reference numerals, in which.

DETAILED DESCRIPTION OF THE INVENTION

A brief review of some terminology commonly used when describing add/drop in the WDM context will be helpful to understanding terms used in the detailed description of the invention that follows. In WDM systems that transport a WDM signal having a plurality of optical channels of different wavelengths, add/drop generically refers to a capability whereby individual optical channels are removed from the WDM signal and/or added to the WDM signal. At a typical add/drop node, an optical channel of a particular wavelength in an incoming WDM signal can generally either be dropped from the WDM signal or passed through the add/drop node without being dropped. An optical channel of a particular wavelength can also be added to the WDM signal. Because most WDM systems today only allow a subset of the total number of channels to be dropped due to the aforementioned limitations, optical channels that are passed through a node without being dropped typically fall into one of two categories. In particular, an optical channel that could be dropped (e.g., allocated for drop) but is not selected for drop at a particular node is typically called a "through" channel. By contrast, an optical channel that cannot be added or dropped at a particular node, e.g., it is not within the subset or band of channels that can be dropped, is typically called an "express" channel. That is, the channel is expressly routed through the node bypassing all components in the node associated with the add/drop function.

Figure 1:
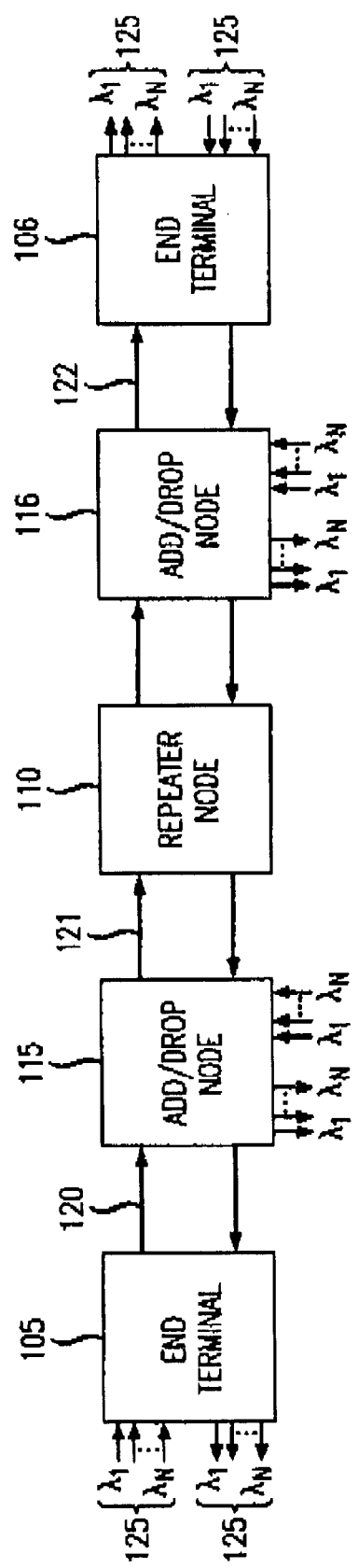
FIG. 1 shows a simplified network configuration in which the principles of the invention can be used.

FIG. 1 shows a simplified network configuration in which the principles of the invention can be used. In particular, FIG. 1 shows a 2-fiber linear system 100 comprising a pair of end terminals 105 and 106 with one or more repeaters 110 and/or optical add/drop nodes 115–116 therebetween. As is well known, repeater 110 would be used, for example, to amplify the WDM signal being transported through the WDM system without providing an add/drop capability. As shown, system 100 shows two directions of communication.

In operation, N optical channels 125 (labeled as $\lambda_1$ to $\lambda_N$) are multiplexed to form WDM signal 120 at end terminal 105. WDM signal 120 is then routed via optical fiber to add/drop node 115 where N optical channels 125 can be dropped from WDM signal 120 and added to WDM signal 120. Add/drop node 115 then generates WDM signal 121 which comprises N optical channels 125 of the same wavelengths as WDM signal 120, but possibly carrying different communications traffic on one or more of the optical channels that were added or dropped from the original incoming WDM signal 120. From add/drop node 115, WDM signal 121 is then transported through repeater 110, where signal amplification occurs by well-known means, and then on to add/drop node 116 where add/drop processing similar to that previously described for add/drop node 115 occurs. Briefly, add/drop node 116 receives WDM signal 121, adds/drops selected ones of N optical channels 125, and outputs WDM signal 122. Again, WDM signal 122 includes N optical channels 125 of the same wavelengths as incoming WDM signal 121, but possibly carrying different communications traffic depending on the add/drop processing that occurred at add/drop node 116. WDM signal 122 is then transmitted to end terminal 106 where optical demultiplexing and other well-known processing occurs to generate N individual optical channels 125. The other direction of communication, from end terminal 106 to end terminal 105 will be similar to that previously described for communication from end terminal 105 to end terminal 106 and will not be repeated here for sake of brevity. It should be noted that system 100 is shown in simplified block diagram form and is only meant to represent one illustrative example. Accordingly, the principles of the invention are not meant to be limited in any manner by the exemplary configuration shown in FIG. 1.

Figure 2:
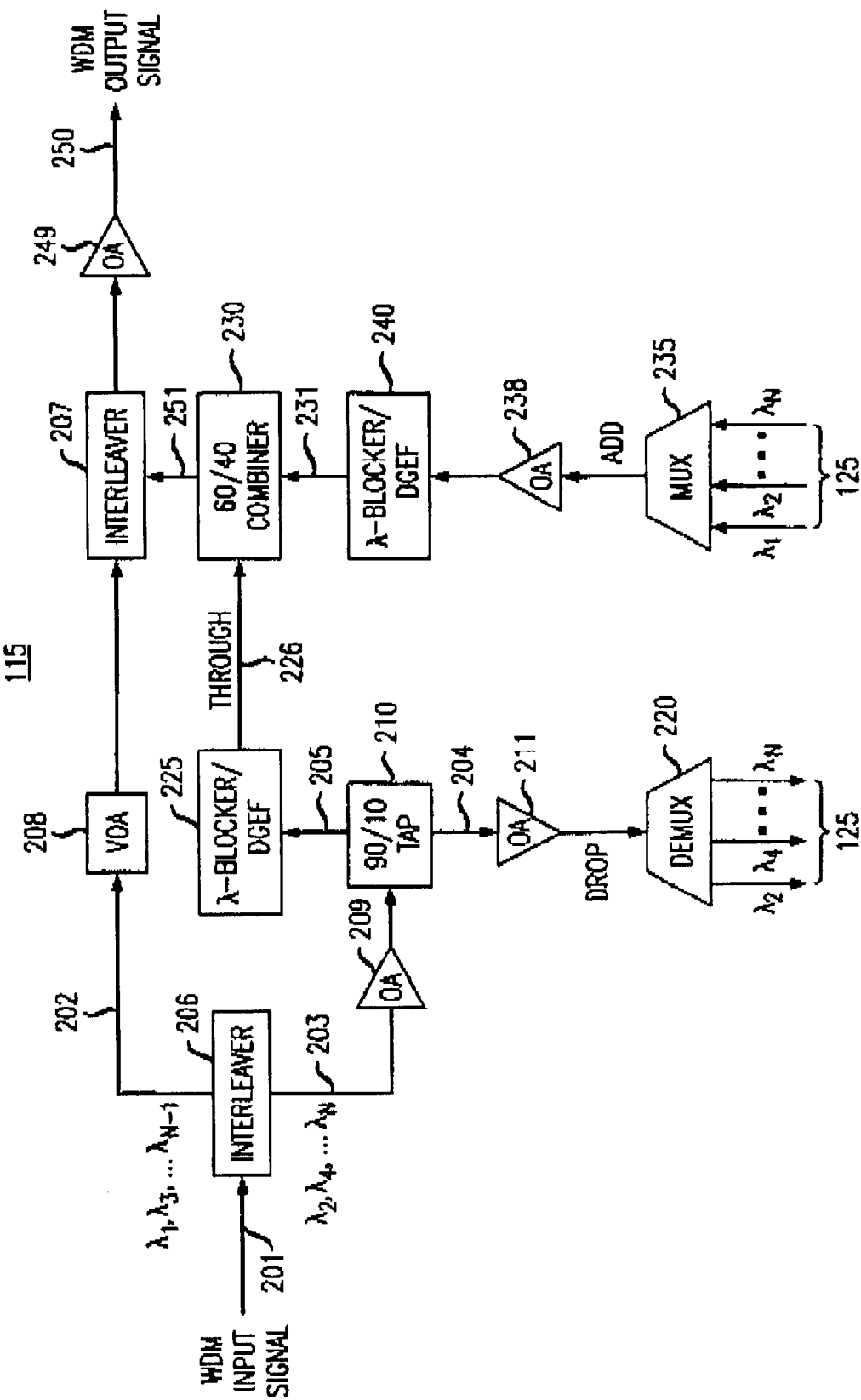
FIG. 2 is a simplified block diagram of an add/drop node in which the principles of the invention can be used.

FIG. 2 shows a simplified block diagram of add/drop node 115 from FIG. 1 in which the principles of the invention can be used. More specifically, FIG. 2 illustrates an add/drop arrangement described in U.S. patent application Ser. No. (Caroli 2-54-9), filed on Jun. 29, 2001 and entitled "Wavelength-Selective Add/Drop Arrangement for Optical Communication Systems", which is hereby incorporated by reference in its entirety. Briefly, a WDM input signal 201 is received by add/drop node 115 and supplied to interleaver 206 which separates individual optical channels within WDM input signal 201 according to a prescribed pattern or arrangement such that a first group of optical channels in path 202 include all odd numbered optical channels (i.e., $\lambda_1$, $\lambda_3$, ... $\lambda_{N-1}$) while a second group of optical channels in path 203 include all even numbered optical channels (i.e., $\lambda_2$, $\lambda_4$, ... $\lambda_N$). The first group of optical channels in path 202 are routed directly through node 115 without passing through any components associated with dropping channels. As such, path 202 is commonly referred to as an "express" transmission path. The optical channels in path 202 are routed through variable optical attenuator 208, which is used for controlling the signal power level of the optical channels in that path, which will be described in further detail below, and then to interleaver 207.

The second group of optical channels in path 203 are first routed through optical amplifier 209 and then to a conventional 90/10 tap coupler 210 which taps off 90% of the optical signal power of the incoming WDM signal (optical channels $\lambda_2$, $\lambda_4$, ... $\lambda_N$) and routes these along path 205 to wavelength blocker 225. 10% of the optical signal power of the incoming WDM signal (optical channels $\lambda_2$, $\lambda_4$, ... $\lambda_N$) is tapped off and routed via "drop" path 204 to optical amplifier 211. As such, each of paths 204 and 205 carries each of the optical channels corresponding to wavelengths $\lambda_2$, $\lambda_4$, ... $\lambda_N$. Optical demultiplexer 220 is coupled to path 204 for receiving and demultiplexing the WDM signal into its constituent optical channels 125, labeled here as $\lambda_2$, $\lambda_4$, ... $\lambda_N$. In this manner, any of optical channels 125 can be dropped at add/drop node 115. Other conventional components not shown in FIG. 2 would be used for extracting the optical channels to be dropped, e.g., filters, receivers, and so on.

Wavelength blocker 225 is used to selectively pass or block selected optical channels on a per-channel basis. In the embodiment shown in FIG. 2, those optical channels being dropped via path 204 would be blocked by wavelength blocker 225 while those optical channels not being dropped would be passed through to path 226, labeled here as "through" path 226. The optical channels passed by wavelength blocker 225 are routed on "through" path 226 to combiner 230 where they are combined with any optical channels being added via add path 231. In particular, optical multiplexer 235 is used to multiplex N optical channels 125 (e.g., having the same wavelength assignments as the WDM input signal 201) to form a composite WDM signal. Any of the N optical channels 125 can be the optical channel carrying communication traffic that is to be added to the WDM signal. However, because only one or more (but probably less than N) optical channels are actually carrying communication traffic to be added to the WDM signal, the WDM signal output by optical multiplexer 235 is coupled to wavelength blocker 240 which would operate similarly to wavelength blocker 225 as previously described. That is, wavelength blocker 240 would selectively pass or block individual optical channels such that only those optical channels that are actually to be added at add/drop node 115 would be allowed to pass via "add" path 231 to combiner 230. All other "unused" optical channels carried in add path 231 would be blocked by wavelength blocker 240 in order to prevent signal collisions with optical channels having the same wavelengths in "through" path 226. Accordingly, all optical channels being dropped or added at add/drop node 115 would be blocked by the respective wavelength blocker 225 and 240 in this illustrative embodiment.

Combiner 230 then combines the optical channels in "through" path 226 with the individual optical channels being added from "add" path 231. The combined multi-wavelength signal is then routed via path 251 to interleaver 207 where it is interleaved with the multi-wavelength signal that comprises those optical channels expressly routed from "express" path 202. The interleaved signal is then amplified by optical amplifier 249 for transmission as WDM output signal 250 to the next node in the network. WDM output signal 250 includes a plurality of optical channels using the same wavelengths as in WDM input signal 201, but possibly carrying different communications traffic depending on whether individual optical channels were dropped and/or added at add/drop node 115.

The principles of the invention will now be described with reference to the steps shown in FIG. 3 as applied within add/drop node 115 in FIG. 2. In general, optical signal power levels for selected optical channels processed within add/drop node 115 are adjusted as a function of variations in signal power that are present in WDM input signal 201 as a result of gain ripple. As is well known, gain ripple is manifested as a substantially non-random power divergence whereby signal power of individual optical channels in a WDM signal varies in a somewhat sinusoidal-type pattern or profile that is sometimes referred to as a "ripple curve". As stated, ripple can be problematic in an add/drop node where some individual optical channels are expressly routed through a node without processing to compensate for ripple (e.g., gain flattening or other equalization techniques) and then combined with other optical channels that do not exhibit the same ripple-induced variations. As such, power levels of newly added optical channels, for example, would not necessarily match the ripple curve of the "express" channels. This combined signal would then exhibit significant adjacent channel power divergence that could then cause further problems at a downstream node. These problems could include, for example, increased crosstalk when the WDM signal is demultiplexed, bit errors, and over-compensated or under-compensated gain flattening at the downstream node, to name a few.

Figure 3:
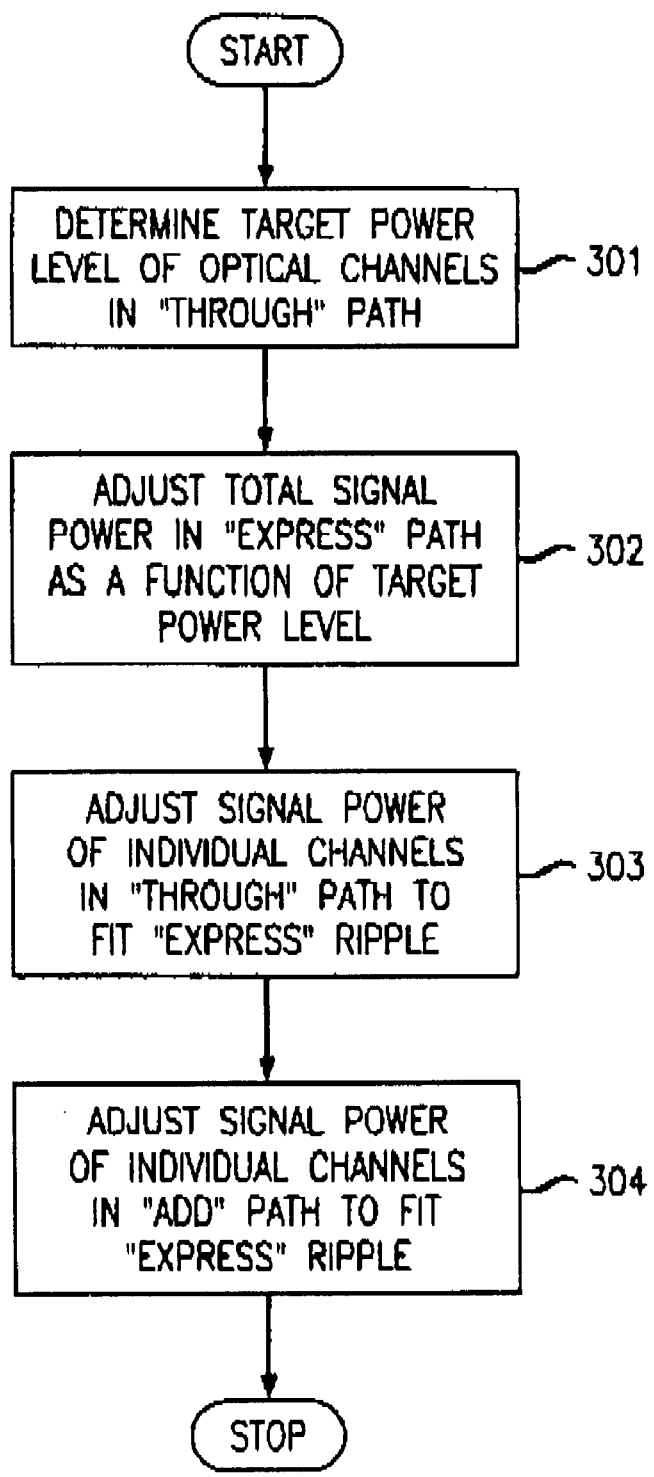
FIG. 3 is a simplified flow diagram of a method according to one illustrative embodiment of the invention.

As shown in FIG. 3, a "ripple fitting" algorithm is implemented in add/drop node 115 (FIG. 2) according to the principles of the invention to compensate for the aforementioned problem. In particular, power levels of optical channels being added via "add" path 231 as well as those optical channels that are routed via "through" path 226 are adjusted to approximately correspond with the ripple curve of the optical channels in "express" path 202. As such, the gain ripple in WDM output signal 250 would approximately correspond to the gain ripple in WDM input signal 201.

More specifically and according to the principles of the invention, a target signal power level of the optical channels in "through" path 226 (FIG. 2) is determined in step 301 (FIG. 3). In step 302, the total signal power of the optical channels in "express" path 202 (FIG. 2) is adjusted, e.g., using variable optical attenuator 208, to a level that is approximately equal to or slightly lower than the target signal power level of the optical channels in "through" path 226. This adjustment to the signal power in "express" path 202 is considered a coarse adjustment in that the total signal power is variably attenuated to an identified level (e.g., target signal power level) without taking into account how much individual optical channels may need to be further adjusted to match ripple-induced power deviations. Instead, these latter, fine tuning type adjustments occur in steps 303 and 304. In particular, signal power levels of the individual optical channels in "through" path 226 are adjusted in step 303 to approximately match the ripple curve (e.g., power divergence profile) of the optical channels in "express" path 202. In the embodiment shown in FIG. 2, this fine tuning is accomplished using the dynamic gain equalization function of wavelength blocker 225, which was described in the aforementioned referenced U.S. patent application Ser. No. (Caroli 2-54-9). In step 304, the signal power levels of the individual optical channels being added via "add" path 231 are similarly adjusted to approximately match the ripple curve of the optical channels in "express" path 202.

Figure 4:
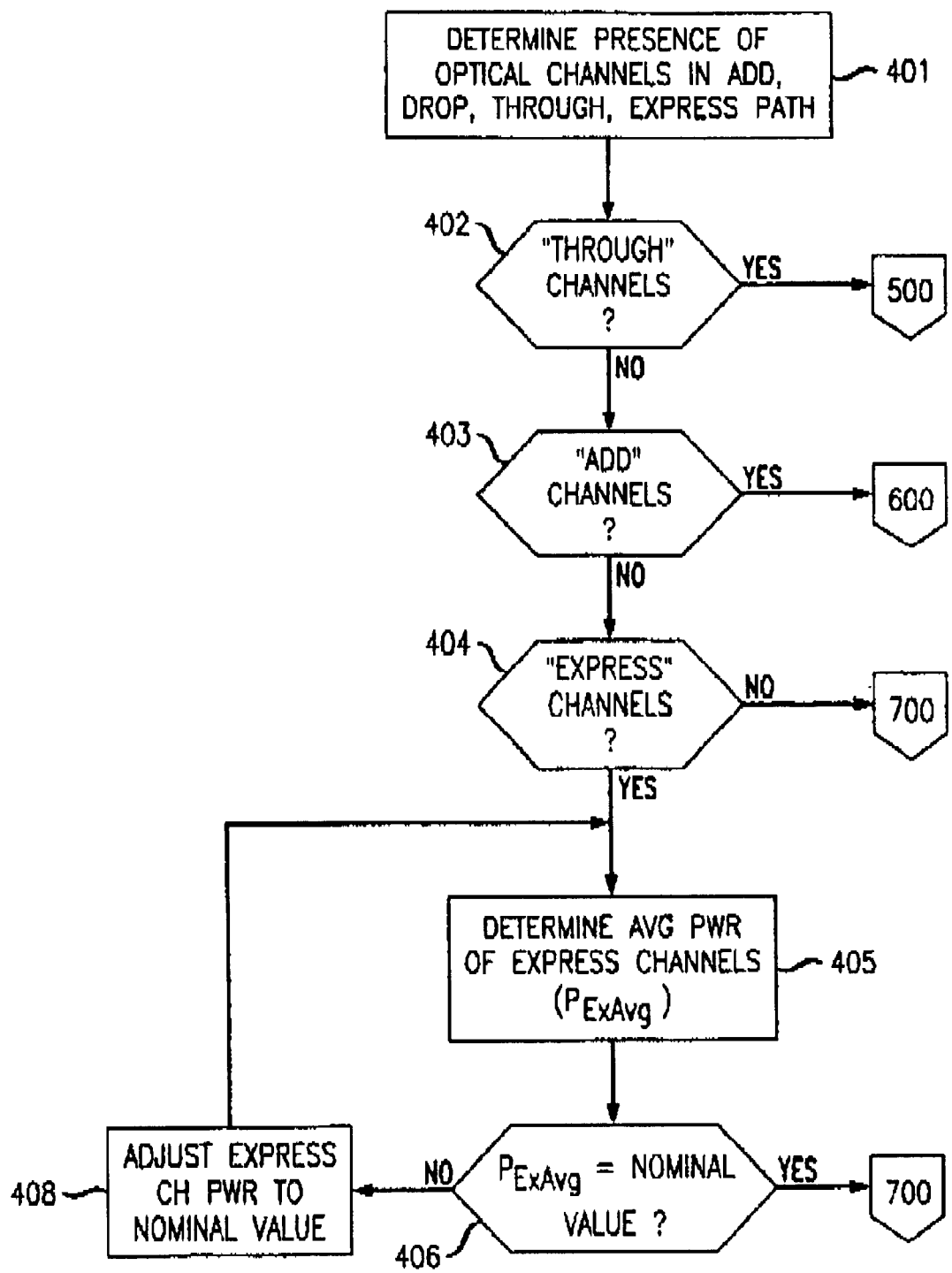
FIGS. 4–8 are simplified flow diagrams of a method according to another illustrative embodiment of the invention.

FIG. 4 shows a more detailed flow diagram of a method according to the principles of the invention. As in the preceding embodiment, the method steps will again be described in the context of add/drop node 115 in FIG. 2. In step 401, a determination is made as to whether optical channels are present in the various transmission paths within add/drop node 115 in FIG. 2, e.g., "add" path 231, "through" path 226, and "express" path 202. By way of example, conventional signal monitoring, e.g., optical spectrum analyzers and so on, can be used to scan the WDM signal and detect the presence of optical channels at particular wavelengths. Because wavelength blockers 225 and 240 are used in add/drop node 115 to selectively pass or block particular wavelengths, step 401 could also include checking the mapping assignments for each of the wavelength blockers as well.

If "through" channels are detected, as determined in decision step 402, then process 500 would be invoked which will be described in further detail below. If "through" channels are not detected, the next decision is based on whether "add" channels are detected as shown in step 403. If detected, then process 600 would be invoked which will be described in further detail below. If not detected, the next decision is based on whether "express" channels are present in the WDM signal as shown in step 404. If none are detected, then process 700 is invoked, which will be described in further detail below. In general, process 700 includes various checks that are made to verify that appropriate conditions are met, e.g., final checks.

If "express" channels are detected, then the average signal power of the "express" channels ($P_{EXAvg}$) is determined in step 405. By way of example, the average signal power can be derived by scanning the signal power of each of the "express" channels using signal monitoring techniques and calculating the average therefrom. In step 406, the average signal power ($P_{EXAvg}$) derived in step 405 is compared to a prescribed value, e.g., a nominal value such as −34.9 dBm, which is a matter of design choice and dependent on various factors that will be apparent to those skilled in the art such as loss budget and so on. If the average signal power ($P_{ExAvg}$) is equal to the nominal value, then process 700, which will be described in further detail below, is invoked to verify that certain conditions have been met, e.g., final checks.

If not, then the signal power of the "express" channels is adjusted to the nominal value in step 408. Referring back to FIG. 2, variable optical attenuator 208 would be used to adjust the signal power of the "express" channels accordingly. Following with the example above where the nominal value is −34.9 dBm, a variable optical attenuator having an attenuation range of 16 dB in 0.1 dB increments would be suitable for making the power adjustments. It should be noted that this power adjustment is a broadband adjustment as compared to a per-channel adjustment. However, other alternatives for adjusting the power of the "express" channels will be apparent to those skilled in the art and are therefore contemplated by the teachings herein. As such, this example is meant to be illustrative and not limiting in any manner. Adjustments to the signal power of the "express" channels in step 408 would continue until ($P_{ExAvg}$) is equal to the nominal value (step 406). Alternatively, the adjustment process can be terminated based on a timer, counter or other threshold-based decision criteria (not shown).

Figure 5:
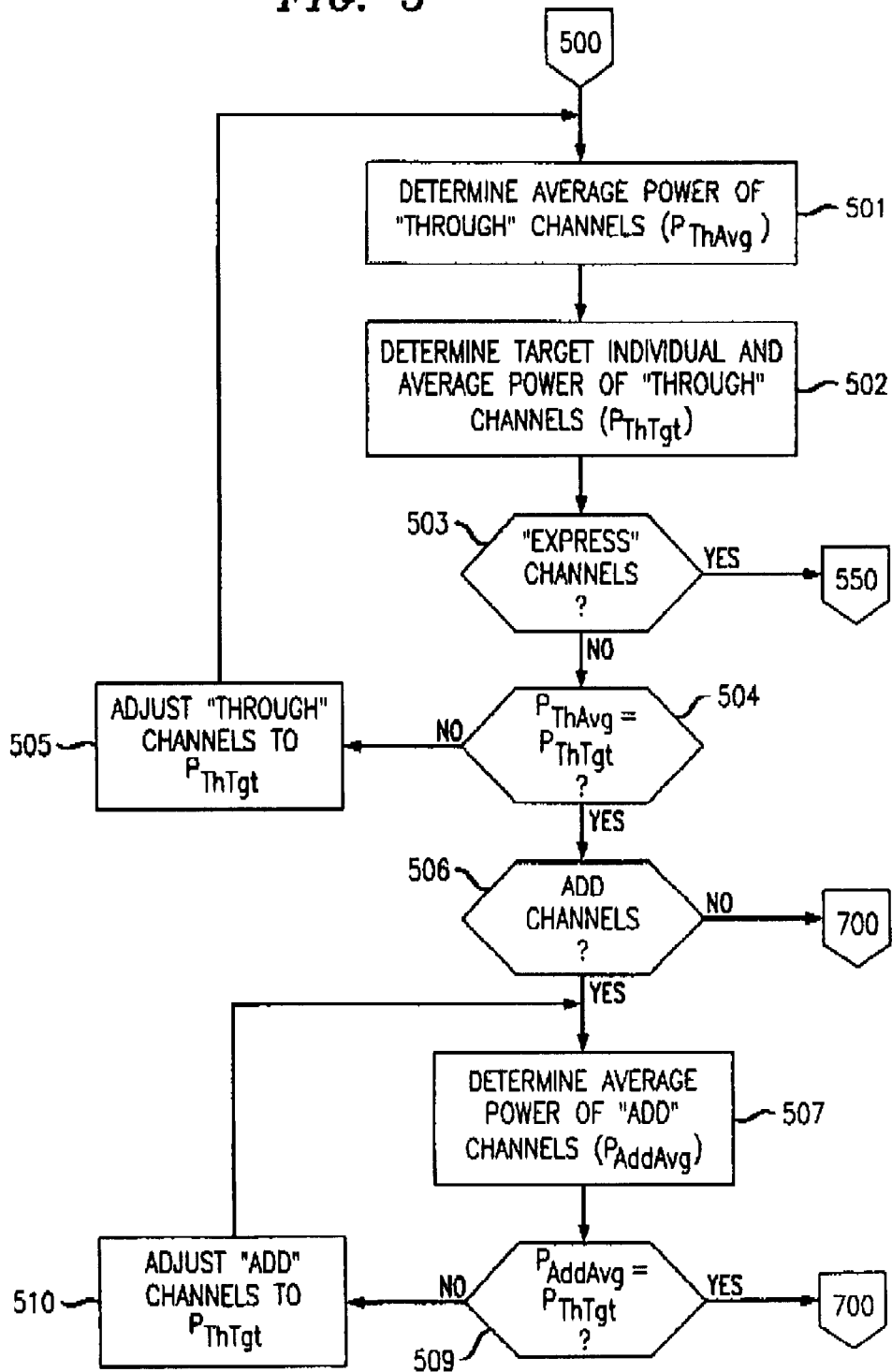

As shown in FIG. 4 in step 402, process 500 in FIG. 5 is invoked if "through" channels are detected. According to one illustrative embodiment of the invention as applied in the context of add/drop node 115 (FIG. 2), "through" channels are used as the baseline or reference for determining other power adjustments. Again, the configuration of an add/drop node may dictate otherwise, but generally "through" channels are processed through more components and typically will experience more loss within an add/drop node as compared to "add" and "express" channels. When this is true for a particular configuration, adjustments to signal power in other channels, e.g., "add" and "express" channels, can then be based on the signal power levels in the "through" channels as a reference or baseline.

As shown in step 501 in FIG. 5, the current average signal power of the "through" channels ($P_{ThAvg}$) is first determined. Again, conventional signal monitoring techniques can be used to derive the average signal power. In step 502, the target individual and average signal power of the "through" channels ($P_{ThTgt}$) is determined. In general, the target average signal power of "through" channels should be as close as possible to a prescribed nominal value, e.g., −34.9 dBm, while allowing for a prescribed amount of "headroom" for adjustment, e.g., ±1 dB. Adjustment "headroom" would be applicable, for example, when wavelength blocker 225 (FIG. 2) is used to adjust the signal power of individual "through" optical channels. To calculate the target individual and average signal power of the "through" channels ($P_{ThTgt}$), one could scan the signal power level of each of the channels by using signal monitoring techniques, for example. A delta or difference between the actual signal power levels and the prescribed nominal value (e.g., the target value) could then be derived and compared to the existing settings of wavelength blocker 225. A target power setting and blocker setting could then be calculated for each optical channel and then averaged. According to this exemplary embodiment, calculation of the target individual and average signal power of the "through" channels ($P_{ThTgt}$) is an iterative process.

In step 503, the presence of "express" channels would invoke process 550 which will be described in further detail below. If "express" channels are not present, as determined in step 503, then the current average signal power of the "through" channels ($P_{ThAvg}$) is compared to the target individual and average signal power of the "through" channels ($P_{ThTgt}$). If $P_{ThAvg}$ does not equal $P_{ThTgt}$ and is not within a prescribed tolerance (e.g., ±0.5 dB), then the signal power of the "through" channels is adjusted to the target individual and average signal power ($P_{ThTgt}$) in step 505. In particular, the signal power of each "through" channel should be adjusted to the target signal power ($P_{ThTgt}$) previously calculated. Referring back to FIG. 2, the attenuation settings in wavelength blocker 225 would be adjusted (up or down) for each of the "through" channels accordingly. It should be noted that this power adjustment is a per-channel adjustment. Adjustments to the signal power of the "through" channels in step 505 would continue until the condition in step 504 is met. Alternatively, the iterative adjustment process could terminate based on some other prescribed parameter, e.g., timer, counter or other threshold-based decision criteria (not shown).

If $P_{ThAvg}$ is equal to $P_{ThTgt}$ or is within a prescribed tolerance (e.g., ±0.5 dB), then the next decision in step 506 is whether there are any "add" channels present. If not, then process 700 is invoked (e.g., final checks), which will be described in further detail below. If present, then the average signal power of the "add" channels ($P_{AddAvg}$) is determined in step 507. Again, this can be accomplished by averaging measurements derived from signal monitoring techniques and so on. In step 509, the average signal power of the "add" channels ($P_{AddAvg}$) is compared to the target individual and average signal power of the "through" channels ($P_{ThTgt}$) and the settings on wavelength blocker 240 are checked. If $P_{AddAvg}=P_{ThTgt}$ or if the blocker settings are either at the minimum or maximum (i.e., no more "headroom" to adjust power), then process 700, which will be described in further detail below, is invoked to verify that certain conditions have been met, i.e., final checks. If $P_{AddAvg}$ does not equal $P_{ThTgt}$, then the signal power levels of the "add" channels are adjusted to the target individual and average signal power of the "through" channels ($P_{ThTgt}$) in step 510. In particular, the signal power of each "add" channel should approximately equal the target signal power ($P_{ThTgt}$) previously calculated. Referring to add/drop node 115 in FIG. 2, the adjustment of signal power in the "add" channels would be accomplished on a per-channel basis using wavelength blocker 240 in "add" path 231. By way of example, the attenuation settings in wavelength blocker 240 would be adjusted (up or down) for each channel accordingly. As shown in FIG. 5, the iterative adjustment process continues until the condition in step 509 is met (e.g., $P_{AddAvg}=P_{ThTgt}$ or the blocker settings are at minimum or maximum setting). Again, the iterative process can also be terminated as a function of a timer, counter or other threshold-based criteria (not shown).

It should be noted that the adjustments to "through" channel power in step 505 and the adjustments to "add" channel power in step 510 are both per-channel adjustments intended to "flatten" out any power divergence that may exist in those channels. In both cases, "express" channels were not present (step 503) and, as such, "fitting the ripple curve" with appropriate channel powers is not a particular concern. Instead, the objective would be to flatten out any ripple that may exist within either of the "through" or "add" channels in these adjustment steps.

Figure 6:
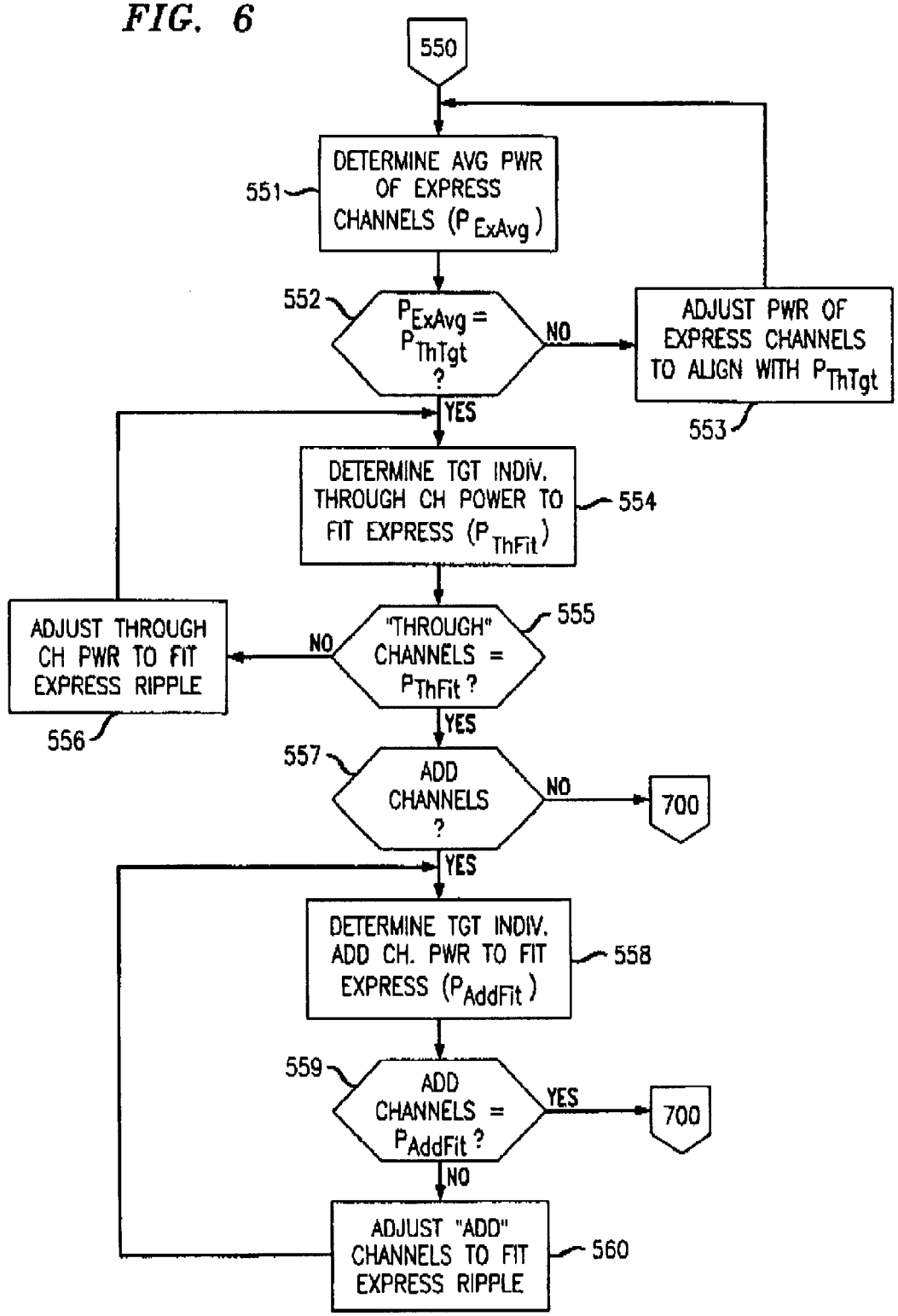

Returning to step 503, if "express" channels are present, then process 550 in FIG. 6 is invoked. More specifically, the average signal power of the "express" channels ($P_{ExAvg}$) is determined in step 551. Again, this can be accomplished using conventional signal monitoring techniques. In step 552, the average signal power of the "express" channels ($P_{ExAvg}$) is compared to the target individual and average signal power of the "through" channels ($P_{ThTgt}$) previously calculated. If $P_{ExAvg}$ is not equal to $P_{ThTgt}$ or is not within a prescribed threshold, e.g., ±0.5 dB, then the power of the "express" channels is adjusted to align with $P_{ThTgt}$ in step 553. Again, variable optical attenuator (VOA) 208 (FIG. 2) can be used to adjust the power accordingly. Because the VOA adjustment is not per channel, the signal power would be adjusted by the delta or difference between $P_{ExAvg}$ and $P_{ThTgt}$. By way of example, a VOA having an attenuation range of 16 dB with 0.1 dB increments would be one suitable implementation for this embodiment. The iterative adjustment continues until the condition in step 552 is met or if some other threshold-based criteria is met (e.g., timer, etc.).

Once the condition in step 552 is met, the target individual "through" channel power to fit the "express" signal ($P_{ThFit}$) is then determined in step 554. Some considerations to be made when determining the target power include, for example, determining whether either or both of the nearest in wavelength "express" channels (e.g., one higher and one lower in wavelength) should influence the target power of the "through" channel. For each "express" channel, this latter determination is a function of the power difference between that particular "express" channel and the target individual and average signal power of the "through" channels ($P_{ThTgt}$) previously calculated, the number of channels between the "express" channel and the "through" channel, and the acceptable slope. The acceptable slope can be a prescribed value, such as <1 dB/nm or approximately 0.25 dB/channel, in one illustrative embodiment. By way of example, if the product of the slope and the number of channels (between the "express" and "through" channel) exceeds the absolute value of the power difference between the "express" channel and $P_{ThTgt}$, then that "express" channel has no influence on the target power of the "through" channel. If an "express" channel has an influence on the "through" channel, then the target power for the "through" channel is a function of the signal power of the "express" channel, the slope, and the number of channels between the "express" and "through" channels. If both "express" channels have an influence on the "through" channel, then the target power for the "through" channel is the average of the two target powers. Each "through" channel outside the influence of an "express" channel should have its target power set to $P_{ThTgt}$.

In step 555, a check is made to determine whether the signal power of the "through" channel of interest is either at the target ($P_{ThFit}$) plus or minus a prescribed threshold (e.g., ±0.5 dB) or whether wavelength blocker 225 is set to its maximum or minimum setting. If neither condition is met, then the signal power of the "through" channel is adjusted to approximately match or otherwise "fit" the "express" channel in step 556. That is, the power of each "through" channel is adjusted to fit into the shape of the "express" channel ripple based on the desired target signal power. Using the target signal power ($P_{ThFit}$), the attenuation settings in wavelength blocker 225 (FIG. 2) should therefore be adjusted (up or down) for each "through" channel accordingly. By way of example, the blocker attenuation range can be 10 dB with 0.5 dB increments in one exemplary embodiment. Once the condition in step 555 is met, the next decision is based on whether "add" channels are present as determined in step 557. If not, the process completes and final checks occur according to process 700, which will be described in further detail below.

If "add" channels are present, then the target individual "add" channel power to fit "express" signal ($P_{AddFit}$) is determined in step 558. Some considerations to be made when determining the target power include, for example, determining whether either or both of the nearest in wavelength "express" channels (e.g., one higher and one lower in wavelength) should influence the target power of the "add" channel. For each "express" channel, this latter determination is a function of the power difference between that particular "express" channel and the target individual and average signal power of the "through" channels ($P_{ThTgt}$) previously calculated, the number of channels between the "express" channel and the "add" channel, and the acceptable slope. The acceptable slope can be a prescribed value, such as <1 dB/nm or approximately 0.25 dB/channel, in one illustrative embodiment. By way of example, if the product of the slope and the number of channels (between the "express" and "add" channel) exceeds the absolute value of the power difference between the "express" channel and $P_{ThTgt}$, then that "express" channel has no influence on the target power of the "add" channel. If an "express" channel has an influence on the "add" channel, then the target power for the "add" channel is a function of the signal power of the "express" channel, the slope, and the number of channels between the "express" and "add" channels. If both "express" channels have an influence on the "add" channel, then the target power for the "add" channel is the average of the two target powers. Each "add" channel outside the influence of an "express" channel should have its target power set to $P_{ThTgt}$.

In step 559, a check is made to determine whether the signal power of the "add" channel of interest is either at the target plus or minus a prescribed threshold (e.g., ±0.5 dB) or whether wavelength blocker 240 is set to its maximum or minimum setting. If neither condition is met, then the signal power of the "add" channel is adjusted to approximately match or otherwise "fit" the "express" channel in step 560. That is, the power of each "add" channel is adjusted to fit into the shape of the "express" channel ripple based on the desired target signal power. Using the target signal power ($P_{AddFit}$), the attenuation settings in wavelength blocker 240 (FIG. 2) should therefore be adjusted (up or down) for each "add" channel accordingly. By way of example, the blocker attenuation range can be 10 dB with 0.5 dB increments in one exemplary embodiment. Once the condition in step 559 is met, final checks according to process 700 are invoked, as will be described in further detail below.

Figure 7:
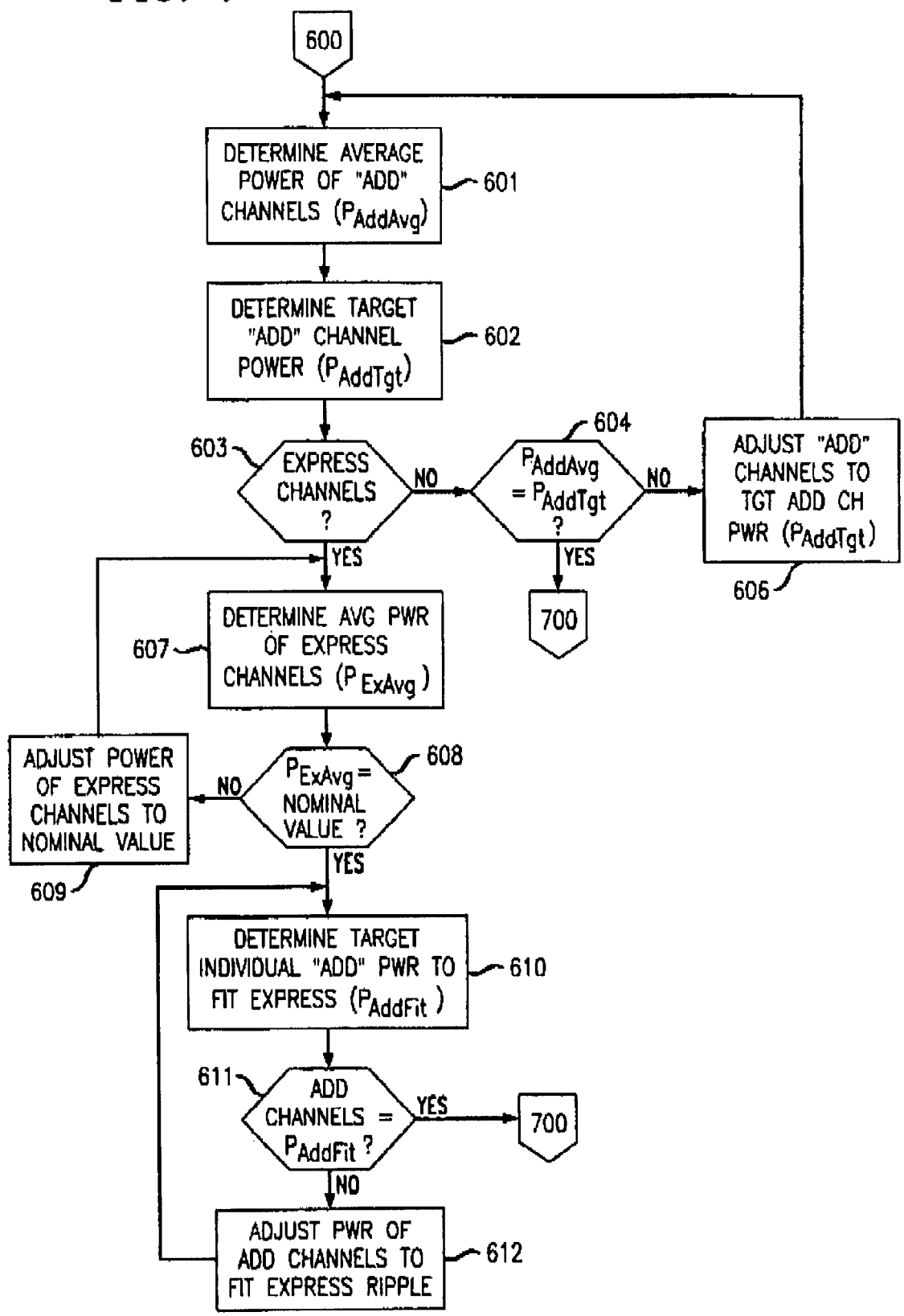

As shown in FIG. 4 in step 403, process 600 in FIG. 7 is invoked if "through" channels are not detected but "add" channels are detected. As shown in step 601, the average signal power of the "add" channels ($P_{AddAvg}$) is first determined. Again, conventional signal monitoring techniques can be used to derive the average signal power. In step 602, the target signal power of the "add" channels ($P_{AddTgt}$) is determined. In general, the target signal power of "add" channels should be as close as possible to a nominal prescribed value, e.g., −34.9 dBm while allowing at least ±1 dB adjustment "headroom" for each "add" channel blocker setting (e.g. wavelength blocker 240). In one exemplary embodiment, this can be accommodated by checking each channels' current power level, determining the delta or difference needed to achieve the target power level (e.g., a prescribed nominal value), comparing the difference to the current setting (e.g., in wavelength blocker 240) for that channel, calculating a target power setting and blocker setting for each channel, and averaging the power settings.

If "express" channels are not present, as determined in step 603, then the average signal power of the "add" channels ($P_{AddAvg}$) is compared to the target signal power of the "add" channels ($P_{AddTgt}$) in step 604. If $P_{AddAvg}=P_{AddTgt}$, or is within a prescribed tolerance (e.g., ±0.5 dB), then no further adjustments are necessary and process 700 can be invoked to conduct final checks. If $P_{AddAvg}$ does not equal $P_{AddTgt}$, then the actual signal power of the "add" channels is adjusted to equal the target signal power of the "add" channels ($P_{AddTgt}$) in step 606. In particular, the signal power of each "add" channel should equal the target signal power ($P_{AddTgt}$). This can be accomplished by changing the attenuation setting in wavelength blocker 240 (FIG. 2) up or down for each channel accordingly. These adjustments continue until the condition in step 604 is met or if terminated based on some other parameter, e.g., timer, counter, and so on.

If "express" channels are present, in step 603, then the average signal power of the "express" channels ($P_{ExAvg}$) is determined in step 607. Again, this can be accomplished using conventional signal monitoring techniques. In step 608, the average signal power of the "express" channels ($P_{ExAvg}$) is compared to a prescribed value, e.g., a nominal value such as −34.9 dBm as in the preceding examples. If $P_{ExAvg}$ is not equal to the prescribed nominal value, then the power of the "express" channels is adjusted to the nominal value in step 609. Variable optical attenuator (VOA) 208 (FIG. 2) can be used to adjust the power accordingly. Because the VOA adjustment is not per channel, the signal power would be adjusted by the delta or difference between $P_{ExAvg}$ and the nominal value. By way of example, a VOA having an attenuation range of 16 dB with 0.1 dB increments would be one suitable implementation for this embodiment. The iterative adjustment continues until the condition in step 608 is met or if some other threshold-based criteria is met (e.g., timer, etc.).

If $P_{ExAvg}$ is equal to the prescribed nominal value in step 608, then the target individual "add" channel power to fit "express" signal ($P_{AddFit}$) is determined in step 610. Determining $P_{AddFit}$ in step 610 is the same as step 558 previously described and, as such, will not be repeated here for sake of brevity. In step 611, a check is made to determine whether the signal power of the "add" channel of interest is either at the target ($P_{AddFit}$) plus or minus a prescribed threshold (e.g., ±0.5 dB) or whether wavelength blocker 240 is set to its maximum or minimum setting. This check is the same as in step 559. Briefly, if neither condition is met, then the signal power of the "add" channel is adjusted to approximately match or otherwise "fit" the "express" channel in step 612 (same as previously described step 560). That is, the power of each "add" channel is adjusted to fit into the shape of the "express" channel ripple based on the desired target signal power. Using the target signal power ($P_{AddFit}$), the attenuation setting in wavelength blocker 240 (FIG. 2) should therefore be adjusted (up or down) for each "add" channel accordingly. By way of example, the blocker attenuation range can be 10 dB with 0.5 dB increments in one exemplary embodiment. Once the condition in step 611 is met, final checks according to process 700 are invoked, as will be described in further detail below.

Figure 8:
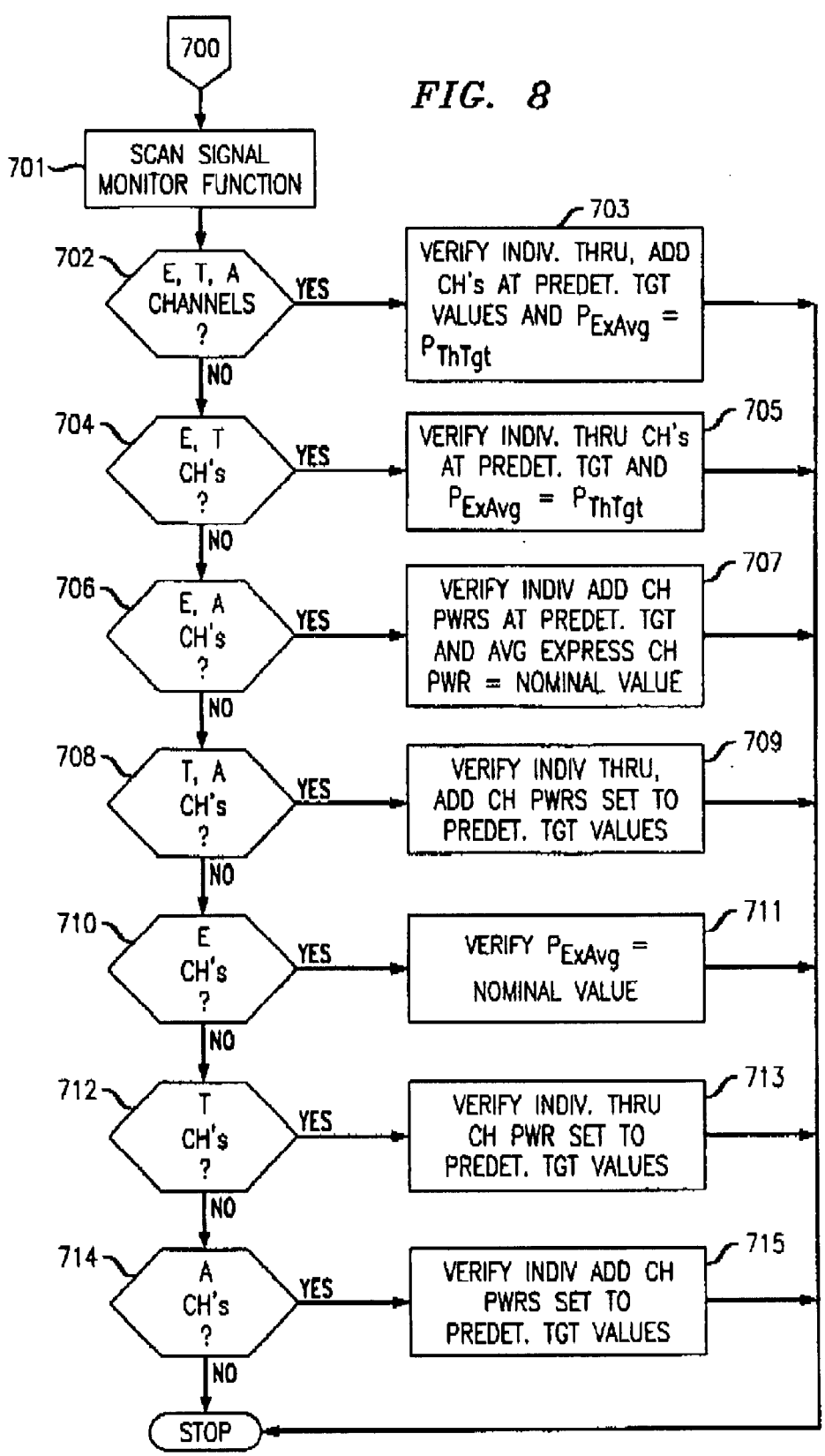

In FIG. 8, process 700 shows a series of decisions and actions for verifying that appropriate conditions are met, e.g., final checks on the various power adjustments made to the "add", "express" and "through" channels in the preceding steps. In general, the steps shown in FIG. 8 include a particular check depending on which types of channels ("add", "express", and/or "through") are detected in the WDM signal at add/drop node 115 (FIG. 2).

As shown in step 701, the presence or absence of particular channels can be determined using conventional signal monitoring techniques, e.g., optical spectrum analyzers and so on. If "express", "through" and "add" channels are all detected in step 702, then step 703 is performed to verify that the individual "through" and "add" channels are set to the respective predetermined target values and that the average signal power of the "express" channels ($P_{ExAvg}$) equals the target individual and average signal power of the "through" channels ($P_{ThTgt}$). If so, the process stops or, if not, then the adjustment process begins again, e.g., step 401 et. seq.

If just "express" and "through" channels are present, as determined in step 704, then step 705 is performed to verify that individual "through" channels are set to the predetermined target values and that $P_{ExAvg}=P_{ThTgt}$. If so, then the process stops or, if not, the adjustment process in step 401 et seq. starts over.

If just "express" and "add" channels are present, as determined in step 706, the step 707 is performed to verify that individual "add" channels are set to the predetermined target values and that $P_{ExAvg}$ equals the prescribed nominal value. If so, the process stops or, if not, the adjustment process in step 401 et seq. starts over.

If just "through" and "add" channels are present, as determined in step 708, the step 709 is performed to verify that individual "through" and "add" channels are set to the predetermined target values. If so, the process stops or, if not, the adjustment process in step 401 et seq. starts over.

If just "express" channels are present, as determined in step 710, then step 711 is performed to verify that the average signal power of the "express" channels ($P_{ExAvg}$) equals the prescribed nominal value. If so, the process stops or, if not, the adjustment process in step 401 et seq. starts over.

If just "through" channels are present, as determined in step 712, then step 713 is performed to verify that the individual "through" channels are set to the predetermined target values. If so, the process stops or, if not, the adjustment process in step 401 et seq. starts over.

If just "add" channels are present, as determined in step 714, then step 715 is performed to verify that the individual "add" channels are set to the predetermined target values. If so, the process stops or, if not, the adjustment process in step 401 et seq. starts over.

It should be noted that the functions of various elements shown in the drawing can be controlled by processors or controllers that may comprise dedicated hardware or hardware capable of executing software. As used herein, a "processor" or "controller" should not be construed to refer exclusively to hardware capable of executing software, and may implicitly include, without limitation, digital signal processor (DSP) hardware, read-only memory (ROM) for storing software, random access memory (RAM), non-volatile storage and so on.

The foregoing embodiments are merely illustrative of the principles of the invention. Those skilled in the art will be able to devise numerous arrangements, which, although not explicitly shown or described herein, nevertheless embody those principles that are within the scope of the invention.

For example, adjustments to signal power in the various optical channels are made in the foregoing embodiments using either wavelength blockers with per-channel dynamic gain equalization or a variable optical attenuator. However, other suitable alternatives for adjusting both total signal power as well as signal power in individual channels will be apparent to those skilled in the art and are contemplated by the teachings herein. Other alternative arrangements and factors for determining target signal power values can also be used consistent with the teachings herein. Furthermore, although the illustrative embodiments show per-channel power adjustments in the add and/or through transmission paths as a function of the power divergence profile in the express transmission path, it is also contemplated that the principles of the invention are equally applicable for adjusting power in any of the different transmission paths individually or in various combinations, e.g., adjusting power in the express and/or through paths, the express and/or add paths, and so on.

It should also be noted that the illustrative embodiments described herein are particularly well-suited for a WDM add/drop node application, and have been described in this exemplary context. However, those skilled in the art will understand from the teachings herein that the principles of the invention may also be employed in other types of network elements that utilize multiple transmission paths for routing and processing individual optical channels in a WDM signal and, in which, it would be desirable to adjust per-channel signal power to match power divergence profiles within and among the different transmission paths.

These modifications and substitutions, as well as others, will be apparent to those skilled in the art in view of well-known network and system design principles and further in view of the teachings herein and, as such, are contemplated for use according to the principles of the invention. Accordingly, the embodiments shown and described herein are only meant to be illustrative and not limiting in any manner. The scope of the invention is limited only by the claims appended hereto.

What is claimed is:

1. A method for controlling signal power of a wavelength division multiplexed (WDM) signal at an add/drop node in a WDM system, the add/drop node adapted for receiving a WDM input signal having a plurality of optical channels, the add/drop node including a first transmission path for adding one or more optical channels to the WDM input signal and a second transmission path for routing selected optical channels of the WDM input signal through the add/drop node, the method comprising:
    adjusting signal power of individual optical channels being added to the WDM input signal in the first transmission path to approximately match a power divergence profile of optical channels in the second transmission path, wherein the power divergence profile is representative of gain ripple in the WDM input signal.

2. The method according to claim 1, wherein the optical channels from the first and second transmission paths are combined at the add/drop node to form a WDM output signal, and wherein gain ripple in the WDM output signal approximately corresponds to the gain ripple in the WDM input signal.

3. The method according to claim 1, further comprising the step of adjusting an average signal power of the optical channels in the second transmission path to a prescribed power level before adjusting signal power of the individual optical channels in the first transmission path.

4. The method according to claim 1, further comprising the step of determining a target signal power for an individual optical channel in the first transmission path such that the target signal power is at a level that fits into the power divergence profile of the optical channels in the second transmission path.

5. The method according to claim 4, wherein adjusting the signal power of the individual optical channels in the first transmission path comprises controlling an amount of attenuation for each individual optical channel in the first transmission path as a function of the target signal power.

6. A method for controlling signal power of a wavelength division multiplexed (WDM) signal at a network element in a WDM system, the network element adapted for receiving a WDM input signal having a plurality of optical channels, the network element including at least a first transmission path and a second transmission path, each of the first and second transmission paths capable of routing one or more of the plurality of optical channels for processing through the network element, the method comprising:
    adjusting signal power of individual optical channels in the first transmission path to approximately match a power divergence profile of optical channels in the second transmission path, wherein the power divergence profile is representative of gain ripple in the WDM input signal.

7. The method according to claim 6, wherein the power divergence profile is representative of gain ripple in the WDM input signal.

8. The method according to claim 6, wherein the first transmission path is selected from the group consisting of an express transmission path for expressly routing selected optical channels of a WDM input signal directly through the network element, a through transmission path for routing selected optical channels through the network element, and an add transmission path for adding selected optical channels to the WDM input signal.

9. The method according to claim 8, wherein the second transmission path is selected from the group consisting of an express transmission path for expressly routing selected optical channels of a WDM input signal directly through the network element, a through transmission path for routing selected optical channels through the network element, and an add transmission path for adding selected optical channels to the WDM input signal.

10. A method for controlling signal power of a wavelength division multiplexes (WDM) signal at a network element in a WDM system, the network element adapted for receiving a WDM input signal having a plurality of optical channels, the network element including a first transmission path for adding selected optical channels to the WDM input signal, a second transmission path for routing selected optical channels through the network element that are not being dropped, and a third transmission path for expressly routing selected optical channels of a WDM input signal directly through the network element, the method comprising:
    determining a target power level of the optical channels in the second transmission path; adjusting total signal power of the optical channels in the third transmission path to a level that is approximately equal to the target power level of the optical channels in the second transmission path before adjusting signal power of individual optical channels in the first and second transmission paths; and
    adjusting signal power of individual optical channels in the first and second transmission paths to approximately correspond with a power divergence profile of optical channels in the third transmission path, wherein the power divergence profile is representative of gain ripple in the WDM input signal.

11. The method according to claim 10, wherein the optical channels from the first, second, and third transmission paths are combined at the add/drop node to form a WDM output signal, and wherein gain ripple in the WDM output signal approximately corresponds to the gain ripple in the WDM input signal.

12. A method for controlling signal power of a wavelength division multiplexed (WDM) signal at a network element in a WDM system, the network element adapted for receiving a WDM input signal having a plurality of optical channels, the network element including a first transmission path for adding selected optical channels to the WDM input signal, a second transmission path for routing selected optical channels through the network element that are not being dropped, and a third transmission path for expressly routing selected optical channels of a WDM input signal directly through the network element, the method comprising:

determining a first target signal power for an individual optical channel in the first transmission path such that the first target signal power is at a level that fits into the power divergence profile of the optical channels in the third transmission path;

determining a second target signal power for an individual optical channel in the second transmission path such that the second target signal power is at a level that fits into the power divergence profile of the optical channels in the third transmission path; and adjusting signal power of individual optical channels in the first and second transmission paths to approximately correspond with a power divergence profile of optical channels in the third transmission path, wherein the power divergence profile is representative of gain ripple in the WDM input signal.

13. A method for controlling signal power of a wavelength division multiplexed (WDM) signal at an add/drop node in a WDM system, the add/drop node adapted for receiving a WDM input signal having a plurality of optical channels, the add/drop node including an express transmission path for expressly routing selected optical channels of a WDM input signal directly through the node, a through transmission path for routing selected optical channels through the add/drop node that are not being dropped, and an add transmission path for adding selected optical channels, the method comprising:

determining a target power level of optical channels in the through transmission path;

adjusting total signal power of optical channels in the express transmission path to a level that is approximately equal to the target power level of the optical channels in the through transmission path;

adjusting signal power of individual optical channels in the through transmission path to approximately correspond with a power divergence profile of the optical channels in the express transmission path, wherein the power divergence profile is representative of gain ripple in the WDM input signal; and adjusting signal power of individual optical channels in the add transmission path to approximately correspond with the power divergence profile of the optical channels in the express transmission path.

14. The method according to claim 13, wherein the optical channels from the express, through, and add transmission paths are combined to form a WDM output signal, and wherein gain ripple in the WDM output signal approximately corresponds to the gain ripple in the WDM input signal.

15. The method according to claim 13, further comprising the steps of:

determining a first target signal power for an optical channel being added in the add transmission path such that the target signal power is at a level that fits into the power divergence profile of the optical channels in the express transmission path; and determining a second target signal power for an optical channel of interest in the through transmission path such that the second target signal power is at a level that fits into the power divergence profile of the optical channels in the express transmission path.

16. The method according to claim 15, wherein determining the first target signal power includes determining whether optical channels in the express transmission path that are nearest in wavelength to the optical channel being added in the add transmission path will influence the target signal power of the optical channel being added.

17. The method according to claim 16, wherein determining whether a particular optical channel in the express transmission path will have an influence on the target signal power of the optical channel being added is a function of a difference factor between signal power of the particular optical channel in the express transmission path and the target power level of the optical channels in the through transmission path, the number of optical channels between the particular optical channel in the express transmission path and the optical channel being added, and a prescribed slope factor.

18. The method according to claim 17, wherein, if the product of the prescribed slope factor and the number of channels exceeds the absolute value of the difference factor, then the target signal power of the optical channel being added is outside the influence of the particular optical channel in the express transmission path, the method then further comprising the step of establishing the first target signal power for the optical channel being added to be equal to the target power level of the optical channels in the through transmission path.

19. The method according to claim 15, wherein determining the second target signal power includes determining whether optical channels in the express transmission path that are nearest in wavelength to the optical channel of interest in the through transmission path will influence the target signal power of the optical channel of interest in the through transmission path.

20. The method according to claim 19, wherein determining whether a particular optical channel in the express transmission path will have an influence on the target signal power of the optical channel of interest in the through transmission path is a function of a difference factor between signal power of the particular optical channel in the express transmission path and the target power level of the optical channels in the through transmission path, the number of optical channels between the particular optical channel in the express transmission path and the optical channel of interest in the through transmission path, and a prescribed slope factor.

21. The method according to claim 20, wherein, if the product of the prescribed slope factor and the number of channels exceeds the absolute value of the difference factor, then the target signal power of the optical channel of interest in the through transmission path is outside the influence of the particular optical channel in the express transmission path, the method further comprising the steps of:

when the target signal power of the optical channel of interest in the through transmission path is outside the influence of the particular optical channel in the express transmission path, establishing the second target signal power to be equal to the target power level of the optical channels in the through transmission path; and when the particular optical channel in the express transmission path does have an influence on the target signal power of the optical channel of interest, deriving the second target signal power as a function of the signal power of the particular optical channel in the express transmission path, the prescribed slope factor, and the number of optical channels.

22. An add/drop node capable of controlling signal power of a wavelength division multiplexed (WDM) signal having a plurality of optical channels, the add/drop node including a first transmission path for expressly routing selected optical channels through the add/drop node, a second transmission path for routing selected optical channels not being dropped through the add/drop node, and a third transmission path for adding selected optical channels to the WDM input signal, the add/drop node comprising:

means for adjusting signal power of individual optical channels in the second transmission path to approximately match a power divergence profile of optical channels being expressly routed through the add/drop node via the first transmission path, wherein the power divergence profile is representative of gain ripple in the WDM input signal; and means for adjusting signal power of individual optical channels in the third transmission path to approximately correspond with the power divergence profile of the optical channels in the first transmission path.

23. The add/drop node according to claim 22, further comprising a signal combiner for combining the optical channels from the first, second, and third transmission paths to form a WDM output signal, and wherein gain ripple in the WDM output signal approximately corresponds to the gain ripple in the WDM input signal.

24. A network element capable of controlling signal power of a wavelength division multiplexed (WDM) signal having a plurality of optical channels, the network element including a first transmission path for adding one or more optical channels to the WDM signal and a second transmission path for routing selected optical channels of the WDM signal through the network element, the network element comprising:

a per-channel dynamic gain equalizer coupled to the first transmission path for adjusting signal power of individual optical channels being added to the WDM signal in the first transmission path to approximately match a power divergence profile of optical channels in the second transmission path, wherein the power divergence profile is representative of gain ripple in the WDM input signal.

25. The network element according to claim 24, further comprising a variable optical attenuator for adjusting an average signal power of the optical channels in the second transmission path to a prescribed power level before the signal power of the individual optical channels in the first transmission path is adjusted by the per-channel dynamic gain equalizer.

26. The network element according to claim 24, further comprising a controller for determining a target signal power for an individual optical channel in the first transmission path such that the target signal power is at a level that fits into the power divergence profile of the optical channels in the second transmission path.

27. The network element according to claim 26, wherein the per-channel dynamic gain equalizer is operable to control an amount of attenuation for each individual optical channel in the first transmission path as a function of the target signal power.

* * * * *